Oct. 2, 1962    H. C. ANDERSON    3,056,958
MEASURING SYSTEM
Filed Aug. 4, 1960    2 Sheets-Sheet 1
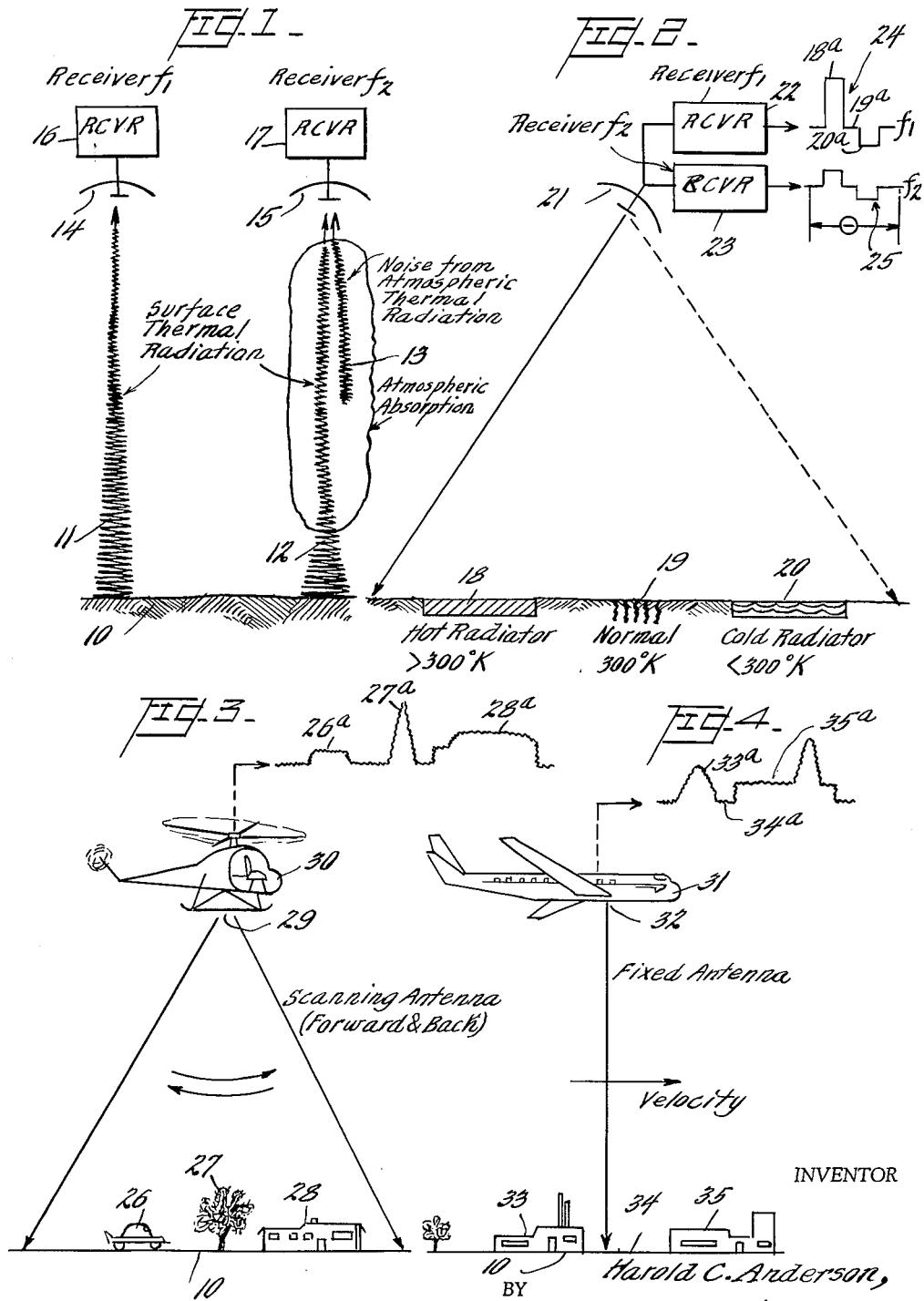
INVENTOR
Harold C. Anderson,
BY
Alfred B. Levine
ATTORNEYS Oct. 2, 1962
H. C. ANDERSON
3,056,958
MEASURING SYSTEM
Filed Aug. 4, 1960
2 Sheets-Sheet 2
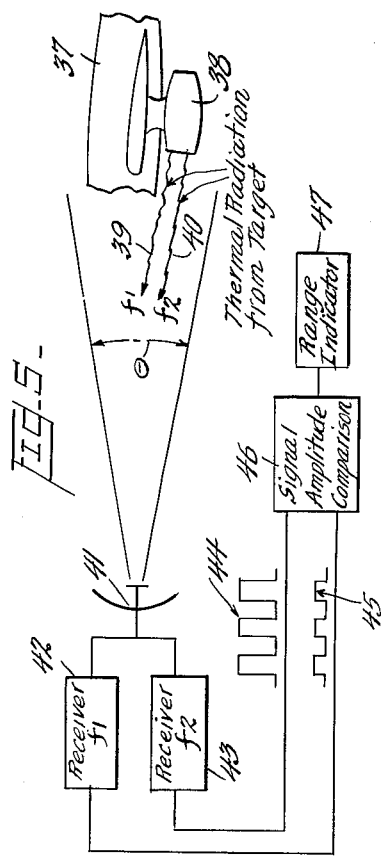
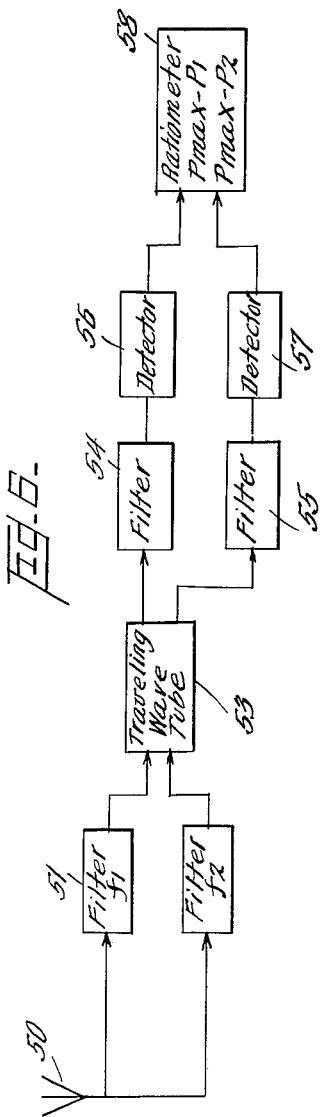
INVENTOR
Harold C. Anderson,
BY Alfred B. Levine
ATTORNEYS

United States Patent Office 3,056,958
Patented Oct. 2, 1962

3,056,958
MEASURING SYSTEM
Harold C. Anderson, Silver Spring, Md., assignor to Litton Systems, Incorporated, College Park, Md.
Filed Aug. 4, 1960, Ser. No. 47,443
15 Claims. (Cl. 343—112)

This invention generally relates to improvements in the measurement of distance or range and more particularly to an improved method and system for passively measuring distance and employing thermal microwave radiations.

It is a known phenomenon that any material or matter that is heated above zero degrees Kelvin radiates electromagnetic waves or radio waves over a broad frequency spectrum. If the matter is sufficiently heated it also emits light waves. However, at a normal ambient indoor temperature of about 70° F. (290° K.), matter does not emit visible light but does produce radio waves which for purposes of the present invention will be referred to as thermal radio waves. Studies of these thermal radio waves have shown that within certain broad frequency bands, the power being generated at the different frequencies is substantially constant.

It is also a known phenomenon that electromagnetic waves at certain frequencies are absorbed or attenuated in passing through the atmosphere by oxygen or water vapor and that such absorption occurs at known rates. A wide bandwidth of frequencies are absorbed by oxygen and are therefore designated as the oxygen absorption band. Since the concentration of oxygen in the atmosphere is substantially constant with time, the absorption rates in the oxygen band are also relatively constant. On the other band, the concentration of water vapor in the air varies from time to time and hence the rates of absorbing radio waves in this bandwith does not remain constant but rather also varies with time.

Within each of these absorption frequency bands, the different radio frequencies are absorbed at different rates and these different frequencies within the bands are referred to as absorption lines. Within the oxygen absorption band, for example, there are a number of absorption lines, with a radio wave at a given frequency being absorbed or attenuated at a different rate than a radio wave at another frequency.

According to the present invention these phenomena are employed in a novel process for determining the distance through the atmosphere between a remote target producing such thermal radio waves and a receiver for detecting the thermal radio waves. More specifically, the distance through the atmosphere between the remote target and the receiver is determined by detecting the power received from thermal radio waves at two different frequencies being radiated from the target. One of the frequencies is selected to lie at a known atmospheric absorption line and hence this wave is absorbed at a constant known rate in passing through the atmosphere and the other or second frequency radio wave is selected at a frequency lying outside any of the atmospheric absorption lines and hence is not absorbed or attenuated in this manner in passing through the atmosphere from the target to the receiver. The two frequencies are also selected from among those that are radiated from the target at the same power whereby the additional power loss of the first wave over the second is in proportion to the distance or range from the target. Since the rate of absorption of the first wave is known, a comparison of the power received at the detector from the first and second waves enables a determination of the degree of attenuation of the first wave by this absorption effect which, in turn, enables calculation of the distance or range of travel of the first wave through the atmosphere.

Since the target continuously radiates the thermal radio waves due to its temperature, this process and system is completely passive and requires no independent transmitter, but merely the detection and comparison of thermal radio waves that are constantly being produced by the heated target. Furthermore, since all heated matter emits such thermal radio waves, the process may be widely applied for many different applications, among which are an altimeter located aboard an aircraft to determine altitude above the earth or to avoid collisions with mountains, or the like, or as a ground based detector to determine the height or range of the craft above the earth.

It is accordingly a principal object of the invention to provide an improved process for passively determining the distance or range through the atmosphere between a given target and a detector.

A further object is to provide such a process and system employing thermal microwave radiation emanated from the target.

A still further object is to provide such a process and system that eliminates the effect of atmospheric noise radiated within the atmospheric absorption line frequency detected.

A still further object is to provide a distance or range measuring process or system requiring less power for operation than known systems.

A still further object is to provide such an improved process and system that is not adversely affected by rain, fog or other atmospheric disturbances.

A still further object is to provide such a process and system that may function at a number of different frequencies.

Other objects and additional advantages will be more readily understood by those skilled in the art after a detailed consideration of the following specification taken with the accompanying drawings wherein:

FIGS. 1 to 4 are schematic illustrations of the waveforms obtained and scanning techniques employed according to the present invention, FIG. 5 is a block diagram representation of a system for applying a process according to the invention, and FIG. 6 is a diagrammatic illustration, similar to FIG. 5, and illustrating further details thereof.

Referring now to FIG. 1 for a detailed consideration of a process employing the invention as an altimeter for determining the altitude of an aircraft or like craft above the earth 10; in the first step, a thermal microwave radiation, generally indicated at 12, and being produced by the earth 10 is received and detected by an antenna 15 and receiver 17 located aboard the craft. The antenna 15 and receiver 17 are tuned to receive radiation at a given frequency of one of the oxygen absorption lines in the atmosphere. Consequently, at this frequency, the ground radiated thermal radio wave 12 is uniformly attenuated by oxygen absorption as it passes through the atmosphere and the degree of attenuation of the radio wave 12 reaching the antenna 15 is proportional to the distance through which the radio wave passes or in other words to the altitude of the detector above the earth.

Concurrently with the detection of thermal radio wave 12, a radio wave 11 at a different frequency, and lying outside any of the atmospheric absorption lines, is detected by a second antenna 14 and receiver 16 located aboard the craft. This latter wave 11 is not attenuated by the atmospheric absorption line effect and consequently the power of the wave 12 received by the antenna line is not diminished by this effect. Thus the antenna 15 receives a thermal radio signal at a given frequency that is diminished by the effect of atmospheric absorption and the antenna 14 receives a thermal radio signal at another frequency that is not diminished by the effect of atmospheric absorption.

In the final step, the signals being received at the first and second frequencies are compared to determine the degree of absorption of the given frequency wave 12 and from this information, and knowing the rate of absorption of the wave 12 at the given atmospheric absorption line, the distance between the antennas 14 and 15 and the ground may be determined.

However, since a good absorbing medium also functions as a good radiating source, a noise signal 13 due to the temperature of the atmospheric gases and the thermal radiation from the ground is also produced in the atmosphere at the given frequency, and being at the same frequency as the ground thermal radio wave 12, this noise component 13 is also detected by the antenna 15. Thus, the power received by the antenna 15 at the first frequency is the sum of the ground radiated thermal radio wave component 12 and the atmospheric noise component 13.

The atmospheric noise signal 13 being generated by the atmosphere is substantially constant at any given altitude and the strength or power of the signal is also substantially the same as the power loss of the ground emitted thermal radio wave 12 being absorbed by the atmosphere. Consequently, to determine the power loss by absorption, and hence the altitude, it is necessary to distinguish between the noise signal component 13 and the ground signal component 12 since the total power being received by antenna 15 from the two components is substantially the same as the power received by antenna 14 from the unabsorbed radio wave 11.

However, it is a further known phenomenon that different types of matter at the same temperature will produce thermal radio waves at different radiated powers since some materials are better radiators of thermal electromagnetic energy than others. For example, an asphalt road on the earth's surface is a far better radiator of thermal radio waves than is grass or natural foliage. Consequentially the power being radiated by the asphalt road will be greater than that being radiated by the grass and the power of the signal being received at the antenna 15 will be greater when observing the road than the grass. Similarly the thermal radio wave power being generated by a body of water will be less than that of the grass and far less than that being produced by the asphalt road, even though each of these materials is at the same temperature.

According to a preferred embodiment of the invention, this latter phenomenon is employed to distinguish between the ground radiated thermal radio wave 12 and the noise component 13 being produced in the atmosphere by employing the further step of moving or rotating the antenna to scan different areas along the earth's surface as generally shown in FIG. 2. As indicated, a single antenna 21 may be employed to receive the thermal radio waves at both frequencies, with the antenna 21 feeding the receiver 23 for detecting the radio wave at the absorption line frequency, and also feeding the receiver 22 for detecting the radio wave at a frequency outside the absorption band. The antenna 21 is rotated or moved to observe a relatively wide area of the earth's surface and consequently sequentially scans a diversity of hot radiator areas such as 18, normal radiator areas 19, and cold radiator areas 20.

As the antenna 21 scans the earth's surface, the signals being detected by receivers 22 and 23 both vary in intensity as the antenna observes the differently radiating bodies on the earth as indicated by the waveforms 24 and 25 located at the right of receivers 22 and 23, respectively. Specifically, as the antenna 21 observes the hot radiator 18, the received signals indicated at 18a are larger than at 19a when the antenna observes normal radiator 19 and, in turn, the signals at 20a are lowest when the antenna observes the cold radiator surface 20. However, during this scanning operation, the noise component 13 being generated by the atmosphere at the absorption line frequency remains substantially constant as the ground radiated component 12 varies due to the different radiating surfaces being observed. Consequently, by suitably correlating the signals 24 and 25 from the receivers 22 and 23 during the scanning operation, the constant atmospheric noise component 13 may be eliminated and the differing attenuations of the two signals due to the absorption line effect may be determined and the distance or range between the antenna and ground easily calculated.

Considering the nature of this correlation of the two signals in greater detail, it is noted that when the antenna 21 is observing a normal radiating surface area such as area 19 on the earth, the signals being detected by receivers 22 and 23 are at about the same level, indicated at 19a, due to the fact that receiver 23 detects the sum of the atmosphere noise component 13 and the ground component 12, and the intensity of the radiated noise component 13 is about equal to the loss of energy of the ground thermal radio wave 12 due to absorption by the atmosphere. However, when the antenna is observing a poorer radiating area on the earth such as area 20, the noise component 13 being detected by receiver 23 remains substantially constant even though the power produced by the ground component 12 is less. Consequently, the net change in the total signal 25 being detected by receiver 23 as the antenna scans from surface 19 to surface 20 is less than the net change in the signal 24 detected by receiver 22 due to the fact that the noise component 13 being detected by receiver 23 remains constant. Similarly, as the antenna 21 scans from a normal radiating surface 19 to hot radiating surface 18, the increased change in the signal detected by receiver 22 is greater than the net increased change in the signal 25 detected by receiver 23.

Stating this condition in another manner, as the antenna 21 scans from a hotter to a normal radiator area, a greater change in the ground emitted radio signal is detected by receiver 22 due to the fact that all of the signal 24 results from the ground emitted radiation and this radiation is not reduced by the atmospheric absorption effect. On the other hand, a large portion of the signal 25 being detected by receiver 23 is constant resulting from the atmospheric noise component and despite the fact that the ground component 12 varies at the same rate as ground component 11, its effect on the total or net signal 25 being detected by receiver 23 is less. Consequently by correlating the signals or comparing the ratio of the powers received for a plurality of scanned areas of the earth's surface, the effect of the atmospheric noise component 13 may be eliminated and the distance or altitude between the antenna and ground may be calculated by the absorption line effect.

FIG. 3 illustrates one application of the preferred process employed as an altimeter for a helicopter or other stationary or slow moving craft. In this application, as in FIG. 2, a rotating antenna 29 is located underneath the craft 30 to scan the earth's surface and provide a time sequence of detected signals for correlating the ground emitted thermal radio signals at two frequencies. As an example of the functioning of such a system, the antenna 29 may be constructed to respond at reasonably high gain to signals over a frequency range of 50 to 60 kilomegacycles and to feed two detectors (not shown) with one detector operating at an oxygen absorption line of 57.3 kmc. and the other operating at a frequency of 50 kmc. which is substantially outside any absorption line. At the frequency of 57.3 kmc., there is one decibel of path loss for each 250 feet of path length due to atmospheric absorption. Consequently after correlation of the two detected signals, if it were found that the power detected at 57.3 kmc. was 80% of the power detected at 50 kmc., then a difference of 1 decibel exists between the two signals and the helicopter is located at a distance of between 238 and 262 feet above ground 10. This range of distance is dependent upon the accuracy of knowledge of the absorption factor that at present has been found to be capable of measurement with an accuracy of about plus or minus five (5) percent. The minimum altitude that may be measured depends upon the capability of the detectors to discriminate between small changes in power. However, the use of parametric amplifiers or maser amplifiers with greater sensitivity and accuracy permits greater range of measurement as well as greater accuracy.

In the event that the process is applied in a more rapidly moving vehicle, such as an aircraft, the scanning antenna may be eliminated and a fixed antenna employed as indicated in FIG. 4. In this application, the antenna 32 may be fixed in position on the underside of the craft 31 and the rapid movement of the craft 31 with respect to the earth enables the antenna to observe a plurality of different radiating areas 33, 34, and 35 on the earth's surface in time sequence permitting correlation of the thermal radio signals at the two frequencies in the same manner as discussed above with the need for rotating the antenna 32.

Although the illustrations of FIGS. 3 and 4 disclose the application of the preferred process as an altimeter, with the detectors comparing the ground emitted thermal radio waves at the two different frequencies, it is believed evident that the invention may be otherwise employed as an obstacle detector to avoid collision with mountains and the like or as a navigation aid. In the former, the antenna would be positioned to scan forwardly of the craft to warn of the presence of mountains or cliffs rising abruptly out of a plain or shore line. As a navigation aid, one of the uses is to enable aircraft flying over water to detect the shortest distance to land. For example, as generally indicated a body of water is a poorer radiation of thermal microwave energy than is land. Consequently, a craft located over water could by means of the present invention scan the horizon until the strongest thermal radio signal were received and thence change its heading toward this radiating source to reach the closest land area available.

The two frequencies being detected should be as close together as possible, while having one of the frequencies lying outside an absorption line, so that any additional absorption due to rainfall, for example, would be the same for both frequencies and not adversely affect the performance of the process. In the event of a rain storm, the total path loss at both frequencies would be greater and hence limit the distance or range of measurement, but the functioning of the process within the more limited range would otherwise be the same and the signal at one frequency would be absorbed at the oxygen absorption line whereas that at the other would not.

As illustrated in FIG. 5, the process may also be applied to determine the range to a moving body, such as an aircraft 37, from the ground or from another moving body. Since different portions of the craft 37 are heated to different temperatures, such as the jet engine 38 being at considerably higher temperature than the body of the craft, the antenna 41 may be scanned, as before, and the signals at two different frequencies being detected by receivers 42 and 43 then correlated by a suitable correlating comparator 46 to determine the height of the aircraft above ground (assuming ground based detectors) or the range to the aircraft, which may be indicated by range indicator 47.

FIG. 6 illustrates further details of one preferred system that may be employed in practicing the process of the invention. As shown, the detection system may include an antenna 50 of suitable construction for receiving the thermal radio signals at both frequencies. At the microwave frequencies involved, a conventional antenna can be made rather small. For example for a frequency range about 50 kmc., the antenna reflector may comprise about a two foot diameter dish providing a gain of 45 decibels and a beamwidth of about 0.7 degree.

To separate the two different frequency signals, the antenna 50 might feed a pair of filters, with each filter being tuned to a different one of the selected frequencies, and the outputs of both filters may be amplified by a single traveling wave tube 53 of known design and construction.

The amplified signals from the tube 53 may be again filtered by filter units 54 and 55, and the signals at the two frequencies next detected at 56 and 57 and finally correlated by radiometer 58. Various other receiving, detecting and correlating systems may also be employed at these frequencies and the system of FIG. 6 should be considered as being exemplary of only one means for practicing the process of the invention.

If the process is to be applied for measurement of distance over a relatively wide range, it is preferred to employ more than one atmospheric line frequency to maintain the sensitivity and accuracy of the system. At long range, for example, a line with weak absorption or lower path loss would be preferred since otherwise the absorption or path loss of that one of the thermal radio signals would be so great that the receiver would encounter difficulty in distinguishing this signal and correlating its power with the unabsorbed signal. Consequently at long range, one of the receivers would be tuned or adjusted to detect a thermal radio wave at a frequency having low absorption.

On the other hand, where the distance to be measured is relatively short, the receiver may be tuned or switched to detect a second absorption line where the signal is more rapidly absorbed so that the difference between the unabsorbed signal and the absorbed signal can be more easily detected and with greater accuracy. Since there are a large number of absorption lines in the oxygen absorption band, for example, with the rate of absorption varying from line to line, with some lines absorbing the signal at a far greater rate than others, the selection of more than one absorption line for different distance ranges permits maximum utilization of the sensitivity of the receivers, amplifiers, and detectors.

For obtaining the utmost in sensitivity according to the invention, the thermal radio waves may be detected over a complete spectrum, that in the oxygen absorption band extends from 15 to 66 kmc. In this spectrum scan process, the peaks and valleys of the thermal radio waves at different absorption line frequencies across the entire absorption band would be sampled and these signals correlated with thermal radio signals lying outside any absorption line.

The process of this invention may also be applied in the infra-red frequency band since it is known that there are regions or lines of absorption in this band and regions where there is little or no absorption. The unabsorbing lines or regions are commonly referred to as "windows" and in an article in the June 1957 issue of the Optical Society of America, entitled "Transmission by Haze and Fog in the Spectral Region 0.35 to 10 Micron" by Arnulf, FIGURE 1 on page 491 illustrates the infra-red absorption phenomena. In tabular form, the data on infrared "window" regions is also given in Table I page 1453 of the September 1959 Proceedings of the IRE in an article by J. N. Howard.

Detectors operating in the infra-red region have the advantage of providing a greater distance range of measurement than those operating in the oxygen absorption frequency bands as discussed above. However, at the infra-red frequencies, the thermal radio waves are absorbed quite rapidly by rain or water vapor whereas thermal radio signals in the oxygen absorption band are not affected as greatly by water vapor.

What is claimed is:

1. A passive method for determining distance to a remote body radiating thermal microwave energy comprising the steps of: detecting at a distance the electromagnetic radiation at one frequency emanating from the body at a series of positions thereon, detecting the electromagnetic radiation at a second frequency being in an absorption frequency band and emanating from the body at a series of positions thereon, and correlating the two detected radiations to determine the relative attenuation of the second frequency radiation with respect to the first thereby to obtain the distance to the remote body.

2. A passive method for determining the distance to a remote body radiating thermal electromagnetic energy comprising the steps of: receiving and detecting the electromagnetic radiation emanating from the body at one frequency lying outside an absorption band, receiving and detecting the electromagnetic radiation emanating from the body at a second frequency lying within an absorption band, and determining the differences in the energies received as a measure of the attenuation of the second frequency radiation thereby to determine the distance to the body.

3. A passive method for determining the distance to a remote body comprising the steps of: detecting the thermal electromagnetic radiation emanating from the body at a first frequency that does not lie in an atmospheric absorption band, detecting the thermal electromagnetic radiation at a second frequency lying in an absorption band and including the thermal radiation component from the body at that frequency and the thermal radiation atmospheric noise component being generated in the absorption band, and correlating the detected radiations at the first and second frequencies to eliminate the noise component and determine the attenuation of the body radiation component at the second frequency and thereby determine the distance to the remote body.

4. In the method of claim 3, the step of correlating the detected radiations at the first and second frequencies being performed by detecting the radiations at the first and second frequencies from a plurality of different positions along the body in time sequence, determining the difference in radiated energy received at the first frequency from different locations on the body, determining the difference in radiated energy received at the second frequency from the same different locations on the body, and measuring the ratio of said differences to obtain the attenuation of said radiation component at the second frequency.

5. In the method of claim 3, the further steps of determining the distance to the remote body at both short and longer ranges with comparable accuracy comprising the additional steps of detecting the thermal radiation at a third frequency lying in a different absorption band and providing greater attenuation than provided in the second frequency band, and correlating the detected radiations at the first and second frequencies at greater distance ranges and correlating the radiations at the first and for lesser distance ranges.

6. In the method of claim 3, the further steps of detecting thermal radiation from the body at additional frequencies lying in different atmospheric absorption bands and selectively correlating the detected radiations at the first and other ones of the second and additional frequencies for different distance ranges to the body.

7. A method for determining the attenuation of a thermal microwave radiation emanating from a body and traveling through the atmosphere, which radiation is in a given frequency band of atmospheric absorption, comprising the steps of: detecting the thermal radiation from the body at a different frequency lying outside the atmospheric absorption band, detecting the thermal radiation at the given frequency, and correlating the detected radiations from a plurality of different locations on the body thereby to eliminate the constant noise from atmospheric radiation in the absorption band and determine the attenuation of the radiation at the given frequency by comparison with the detected radiation at the different frequency.

8. A method for determining the attenuation of a thermal microwave radiation of given frequency emanating from a body and passing through the atmosphere comprising: scanning the radiating body to detect the thermal radiation therefrom at a number of positions, selecting from the detected radiation, the radiated power at a given frequency lying within an atmospheric absorption band, selecting from the detected radiation, the radiated power at a different frequency outside the absorption band, and correlating the detected power at the given frequency with that at the different frequency to determine the attenuation of the given frequency radiation by eliminating the atmospheric noise radiated by the atmosphere within the absorption band.

9. A passive system for determining the distance to a remote body comprising an antenna means for detecting the thermal electromagnetic radiation from the body, filter means for selecting from said detected radiation the radiated signal at a first frequency lying within an atmospheric absorption band and having a known absorption rate, a second filter for selecting from said detected radiation the signal at a second frequency lying outside the absorption band, and comparing means for determining from the signals at said first and second frequency the absorption by the atmosphere of the first frequency signal, thereby to provide the distance to the remote body.

10. In the system of claim 9, said antenna means being movable relative to said body to detect the radiations from different locations on the body, and said comparing means including means for correlating the detected signals at said first and second frequencies to eliminate the effect of atmosphere noise produced by the atmosphere at said first frequency.

11. In the system of claim 10, said antenna means being rotated relative to said body to scan different positions on the body.

12. In the system of claim 11, said selecting means including input and output filters energized by the antenna means for transmitting the signals at each of the first and second frequencies and a microwave amplifier between said input and output filters for amplifying the detected radiations at the first and second frequencies.

13. In the system of claim 12 said microwave amplifier comprising a traveling wavetube.

14. A passive system for determining the distance to a remote body through the atmosphere by employing the thermal microwave radiations emanated from the body comprising: means for receiving thermal electromagnetic radiations from the body at a first frequency lying within an atmospheric band, and receiving radiations from the body at other frequencies within different atmospheric absorption bands, means for receiving radiations from said body at a frequency lying outside said absorption bands, and means for selectively comparing the powers of the radiations received at said different atmospheric absorption bands, each with the power of said radiation at the frequency outside said absorption bands, thereby to determine the absorption by the atmosphere and the distance to the body.

15. In the system of claim 14, the addition of a scanning means for detecting the radiation from said body at a plurality of positions thereon, and means coupling said receiving means to be energized by the scanning means.

References Cited in the file of this patent

UNITED STATES PATENTS

| | | |
|---|---|---|
| 1,961,757 | Gage | June 5, 1934 |
| 2,458,654 | Southworth | Jan. 11, 1949 |